(12) United States Patent
Higashino et al.

(10) Patent No.: US 6,648,936 B2
(45) Date of Patent: Nov. 18, 2003

(54) OIL MIST ELIMINATOR

(75) Inventors: Toshihiro Higashino, Osaka (JP); Keiji Shimakawa, Nabari (JP)

(73) Assignee: Kuraco Limited, Osaka (JP)

( * ) Notice: Subject to any disclaimer, the term of this patent is extended or adjusted under 35 U.S.C. 154(b) by 0 days.

(21) Appl. No.: 10/184,988

(22) Filed: Jul. 1, 2002

(65) Prior Publication Data

US 2003/0000185 A1 Jan. 2, 2003

(30) Foreign Application Priority Data

Jul. 2, 2001 (JP) .......................... 2001-201006

(51) Int. Cl.$^7$ ............................... B01D 45/14
(52) U.S. Cl. ..................... 55/406; 96/189; 416/178; 416/187
(58) Field of Search ......................... 55/400, 406, 407; 96/188, 189; 416/178, 187, 146 R

(56) References Cited

U.S. PATENT DOCUMENTS 5,207,809 A  5/1993  Higashino et al. ............ 55/401

Primary Examiner—Robert A. Hopkins
(74) Attorney, Agent, or Firm—Rader Fishman & Grauer

(57) ABSTRACT

An oil mist eliminator includes an impeller rotating about its axis in one direction within a casing having an inlet and an outlet. The impeller includes a plurality of circumferentially spaced blades held between front and rear discs. The front disc has a center opening for introducing an oil-contaminated air. Each blade is composed of an inner fin extending in a radial direction and an outer fin bent from the inner fin for deflecting the air proceeding between the adjacent inner fins in a forward direction, thereby creating a forced air flow for introducing the air axially from the front opening, guiding it radially between the discs, and venting it axially forwardly in a front-in and front-out fashion. Thus, even a portion of the air being guided immediately along the rear disc can be successfully deflected for collision against the outer fins without fail, maximizing oil separation efficiency.

5 Claims, 8 Drawing Sheets

OIL MIST ELIMINATOR

BACKGROUND OF THE INVENTION

1. Field of the Invention

The present invention is directed to an oil mist eliminator for removing oil mist from a contaminated air and discharge a clean air removed of the oil mist, and more particularly to such an oil eliminator using an impeller which diverts an air flow for separating the oil mist from the contaminated air.

2. Description of the Prior Art

U.S. Pat. No. 5,207,809 discloses an oil mist eliminator using an impeller or fan for separating the oil mist from an oil-contaminated air while changing flow directions. The oil eliminator includes a casing with an inlet and an outlet, and an impeller which is accommodated within the casing and is driven to rotate about a rotation axis of the impeller for drawing the contaminated air from the inlet and discharge a clean air removed of the oil mist out through the outlet. The impeller is of a front-in and rear-out type which draws the air from a front opening of the impeller and vents the clear air rearwards with respect to the rotation axis. In detail, as shown in FIGS. 7 and 8 of the attached drawings, the impeller is composed of a front disc 40P with a center opening 42P, a rear disc 50P coaxial with the front disc, and a plurality of blades 60X which are circumferentially spaced and secured between the front and rear discs. The rear disc 50P is provided with a hub 52P receiving a motor output shaft for rotating the impeller in one direction. Each blade 60P is shaped into a generally L-shaped with an inner fin 68P extending radially between the front and rear discs and an outer fin 61P which is bent from an inner fin 68P towards the rotating direction. The outer fin 61P projects radially outwardly of the discs to deflect a radial air flow guided between adjacent inner fins 68P so as to deposit the oil mist on the outer fin 61P by collision of the oil-laden air against the outer fin, while permitting the air flow in the deflected direction. The outer fin 61P is twisted so as to deflect the air axially rearward for discharging the air out through the outlet. With this arrangement, however, there remains a problem that the air (indicated by arrows in FIG. 8) drawn through the center opening and guided radially outwardly adjacent along the rear disc 50P may partially escape rearwards past the outer circumference of the rear disc without colliding against the outer fin, i.e., without a chance of separating the oil mist from the air. Thus, the oil mist may be still carried on the air being discharged out through the outlet, thereby lowering separation efficiency.

SUMMARY OF THE INVNETION

In view of the above insufficiency, the present invention has been accomplished to provide an oil mist eliminator which is capable of separating the oil mist successfully and efficiently. The oil mist eliminator in accordance with the present invention includes a casing with an inlet and an outlet, and an impeller which is accommodated within the casing and is driven to rotate about a rotation axis for drawing an oil-contaminated air through the inlet and discharging a clean air removed of the oil mist out through the outlet. The impeller is composed of a rear disc provided at its center with a hub for receiving a rotating shaft in registration with the rotation axis, a front disc spaced forwardly of the rear disc in a coaxial relation thereto. The front disc has a center front opening in registration with the inlet for drawing the contaminated air. The impeller includes a plurality of circumferentially spaced blades which are secured between the rear disc and the front disc. Each of the blades is of a generally L-shaped configuration having an inner fin extending generally in a radial direction of the impeller and an outer fin which is bent from the inner fin in a rotating direction of the impeller. The outer fin projects radially outwardly of the rear and front discs to deflect a radial air flow proceeding between the adjacent inner fins so as to deposit the oil mist or the oil particles upon the outer fin by collision against the outer fin, while permitting the clean air removed of the oil mist to flow in a deflected direction.

The characterizing feature of the present invention resides in that the outer fin is twisted with respect to a tangential direction on the circumference of the impeller in a forward direction along the rotation axis such that the outer fin has its inside surface facing in the forward direction, thereby directing the clean air axially forwardly to discharge the same out through the outlet. Thus, the impeller is configured to be of a front-in and front-out type which draws the contaminated air from the front opening and deflect the clean air back in the axially forward direction. With this structure, the contaminated air proceeding axially through the center opening and then being guided radially along the rear disc can be successfully directed towards the outer fin and merge into the axially forward air flow being discharged out from the impeller, thereby minimizing a chance of the air flow partially escaping through the circumference of the impeller without colliding against the outer fin and therefore improving separation efficiency of depositing the oils mist on the outer fin.

Preferably, a bent line along which the outer fin is bent from the inner fin is inclined with respect to the rotation axis such that bent line has a radial distance from said rotation axis which is greater towards its front end than at its rear end. This is advantageous in that the outer fin can have the inside air deflecting surface of increased area within a limited axial dimension between the rear and front discs. In this connection, the outer fin may be shaped to have its front end projecting forwardly beyond a plane of the front disc to give an increased surface area to the inside surface responsible for diverting the air flow.

Further, the width of the outer fin defined between the bent line and an outer circumferential edge of the outer fin may be made greater towards the front end of the outer fin than at the rear end thereof, for efficiently producing the air flow back in the axially forward direction with an attendant enhancement of oil separation efficiency.

The front disc may be additionally shaped to have its outer periphery bent rearwards to form thereat a baffler rim which is inclined with respect to the front disc in order to impede the air flow proceeding radially along the front disc from escaping out through the impeller without colliding against the outer fin.

These and still other objects and advantageous features of the present invention will become more apparent from the following description of the preferred embodiment when taken in conjunction with the attached drawings.

DETAILED DESCRIPTION OF THE EMBODIMENT

Figure 1:
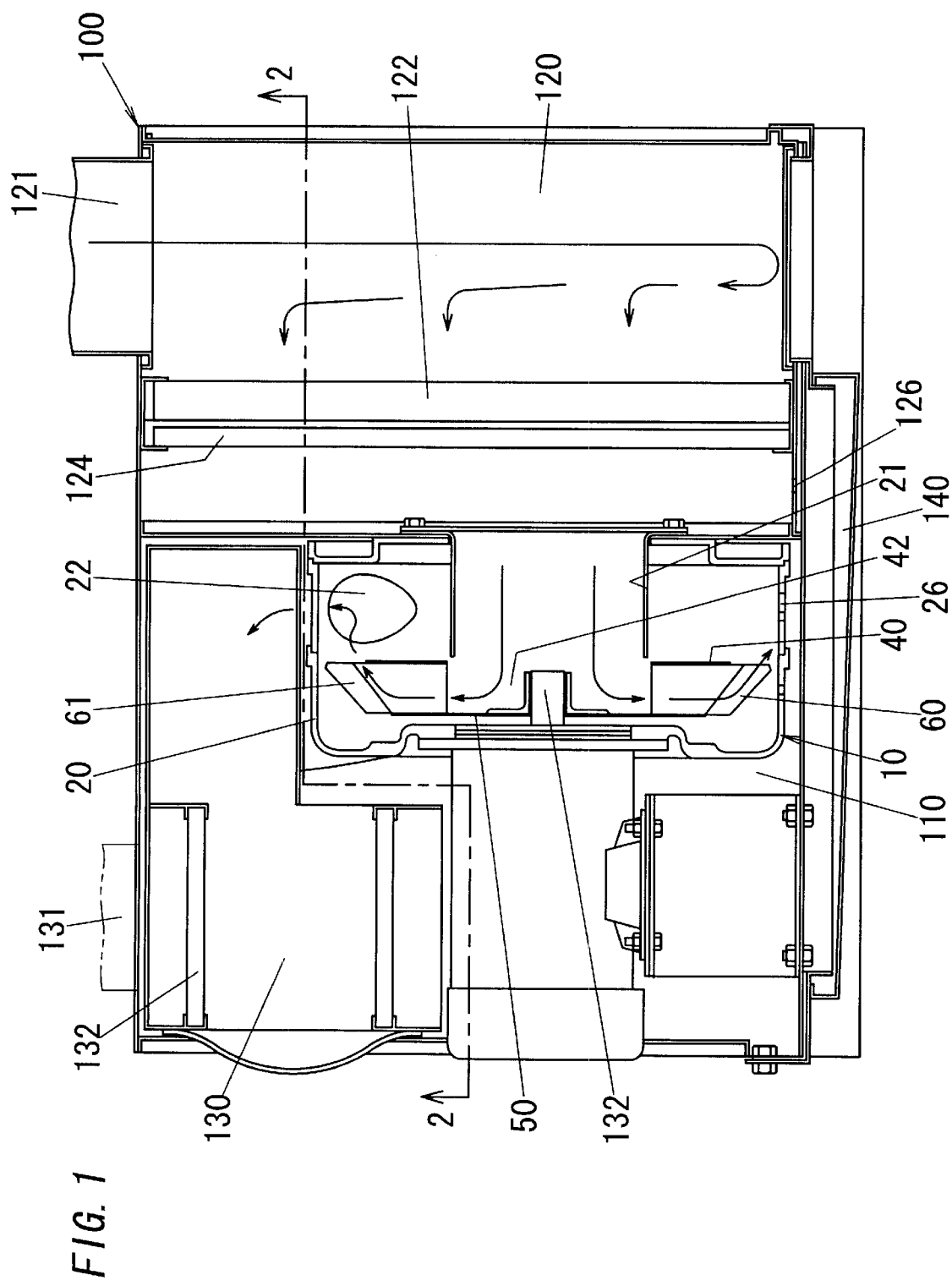
FIG. 1 is a vertical sectional view of an oil recovery system incorporating an oil mist eliminator in accordance with a preferred embodiment of the present invention.
Figure 2:
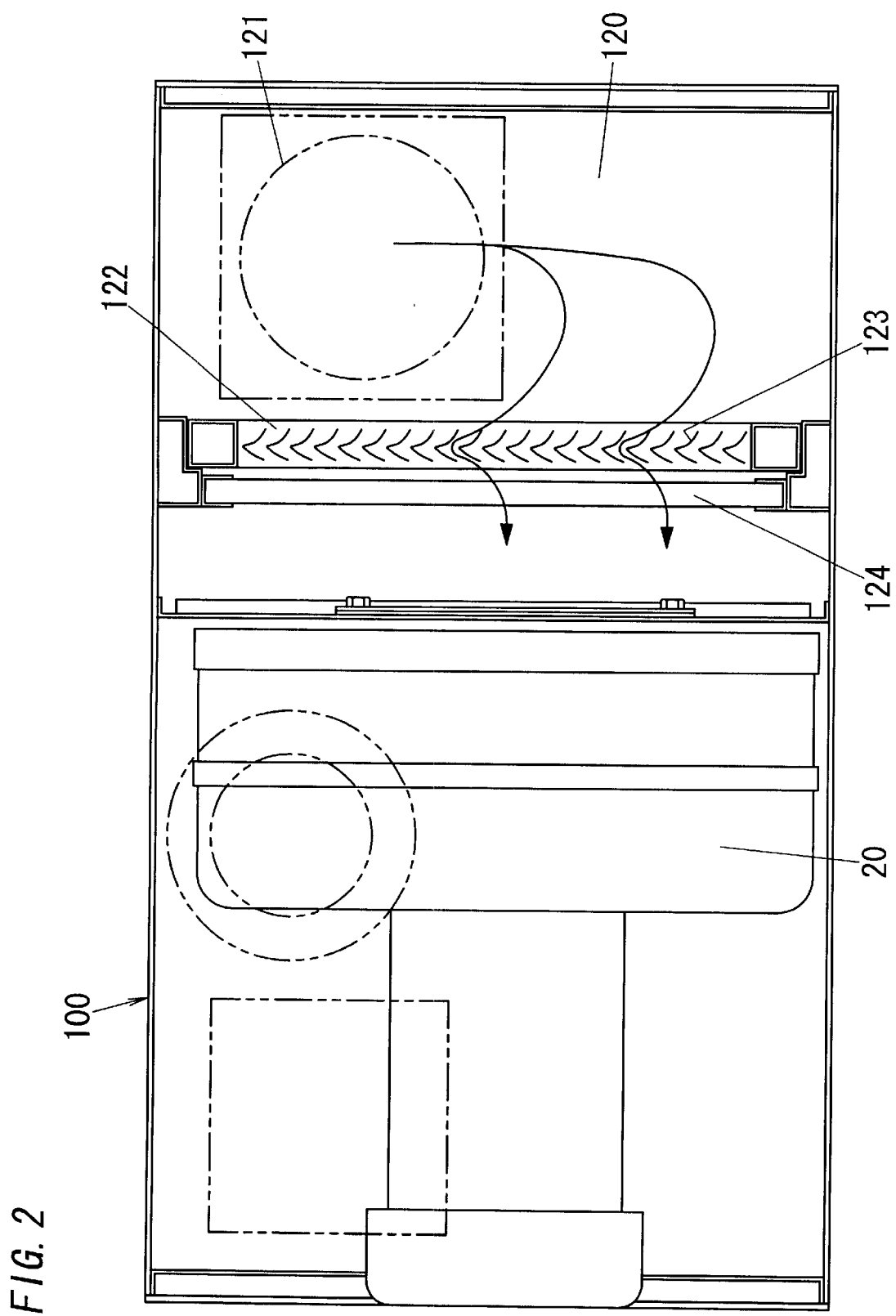
FIG. 2 is horizontal section taken along line 2—2 of FIG. 1.

Referring now to FIGS. 1 and 2, there is shown an oil recovery system incorporating an oil mist eliminator 10 in accordance with a preferred embodiment of the present invention. The system is adapted to be installed in a machine factory where lathes or the like cutting tools are running with an attendant creation of an oil mist, i.e., tiny oil particles spread in the atmosphere, in order to separate the oil particles from the atmosphere and collect thus separated oils for realizing a clean room environment. The system includes a housing 100 having a center chamber 110 for mounting therein the oil mist eliminator 10 which generates a forded air flow from an intake port 121 to an exhaust port 131. The housing 100 further includes a pre-treatment chamber 120 upstream of the eliminator 10 for collecting the oil-contaminated air, a silencing room 130 downstream of the eliminator for muffling a sound of driving the eliminator and at the same time filtering out minute oil particles possibly carried on the air from the eliminator. An oil pan 140 is detachably mounted at the bottom of the housing 100 to collect the oil particles recovered at the eliminator and the chamber 120.

The pre-treatment chamber 120 is provided with an agglomerator 122 and a filter 124. The agglomerator 122 includes a row of L-shaped baffles 123 disposed in the course of the air flow from the intake port 121 to the eliminator 10 for collecting the oil particles of a relatively large diameter. The collected oil particles are dripped from the baffles and are drained through a drain port 126 into the oil pan 140. It is noted here that the intake port 121 is located at the upper end of the chamber 120 to direct an intake air flow towards the eliminator 10 partly after colliding a bottom of the chamber, as indicated by arrows in FIG. 1 so as to deposit the oil particles also on the bottom of the chamber. Thus deposited oil particles are led to the oil pan 140 also through the drain port 126. The filter 124 is disposed adjacent to the agglomerator 122 for filtering out dust or the like foreign matters from the air prior to the air entering the eliminator 10. The silencing room 130 is also provided with a cylindrical filter 132 for filtering out the oil particles not captured by the eliminator to release the clean air out through the exhaust port 131.

The eliminator 10 has a casing 20 fitted within the center chamber 110 and provided with an inlet duct 21 for introduction of the air from the pre-treatment chamber 120 to an inlet 42 of the eliminator 10. The eliminator 10 includes an impeller 30 which is driven by a motor to rotate in one direction for drawing the contaminated air and delivering a clean air removed of the oil mist through an outlet 22 provided in an upper part of the casing 20. The outlet 22 communicates through the silencing room 130 so that the clean air is exhausted out through the exhaust port 131 of the silencing room 130.

Figure 3:
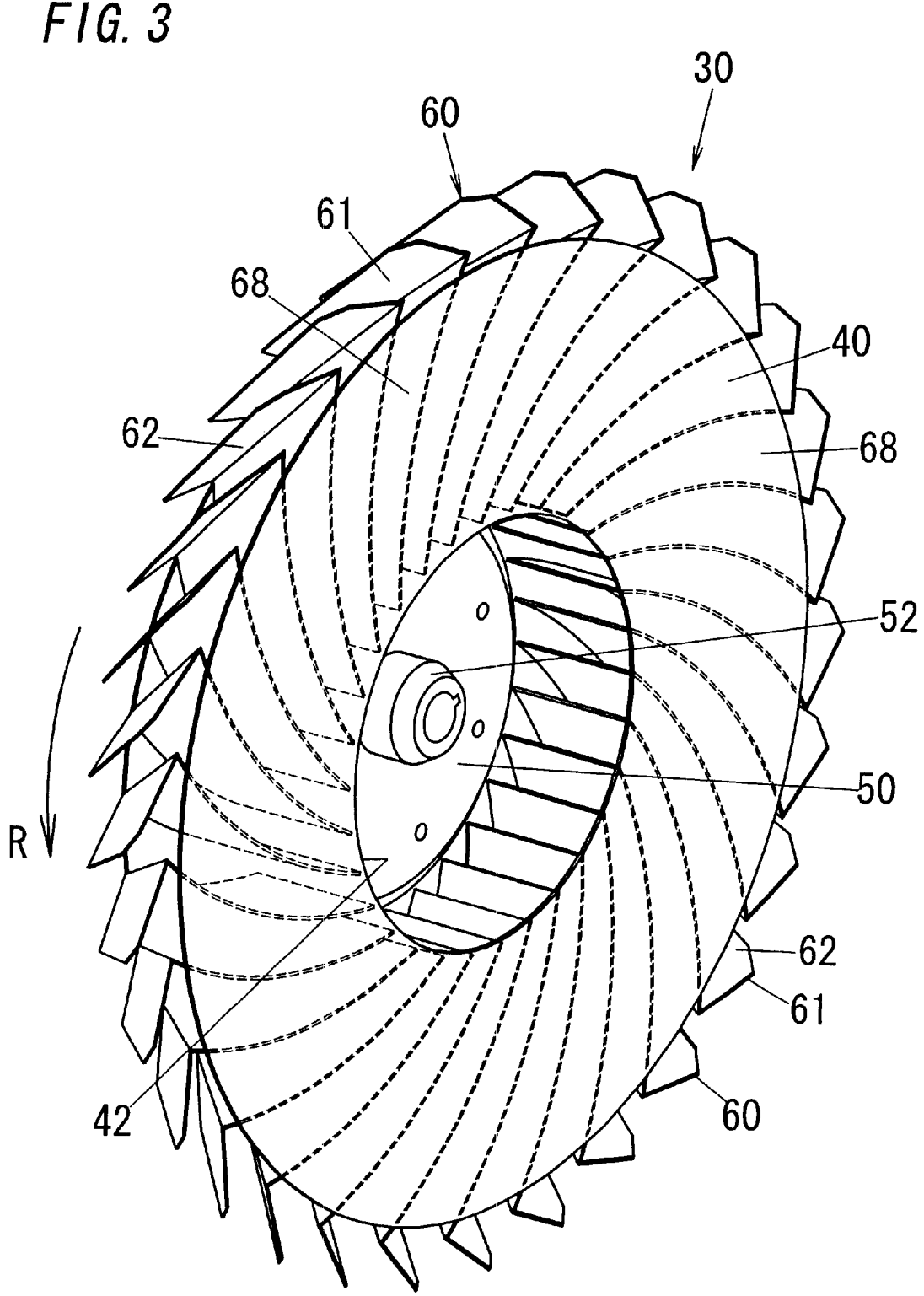
FIG. 3 is a perspective view of an impeller utilized in the above eliminator.
Figure 4:
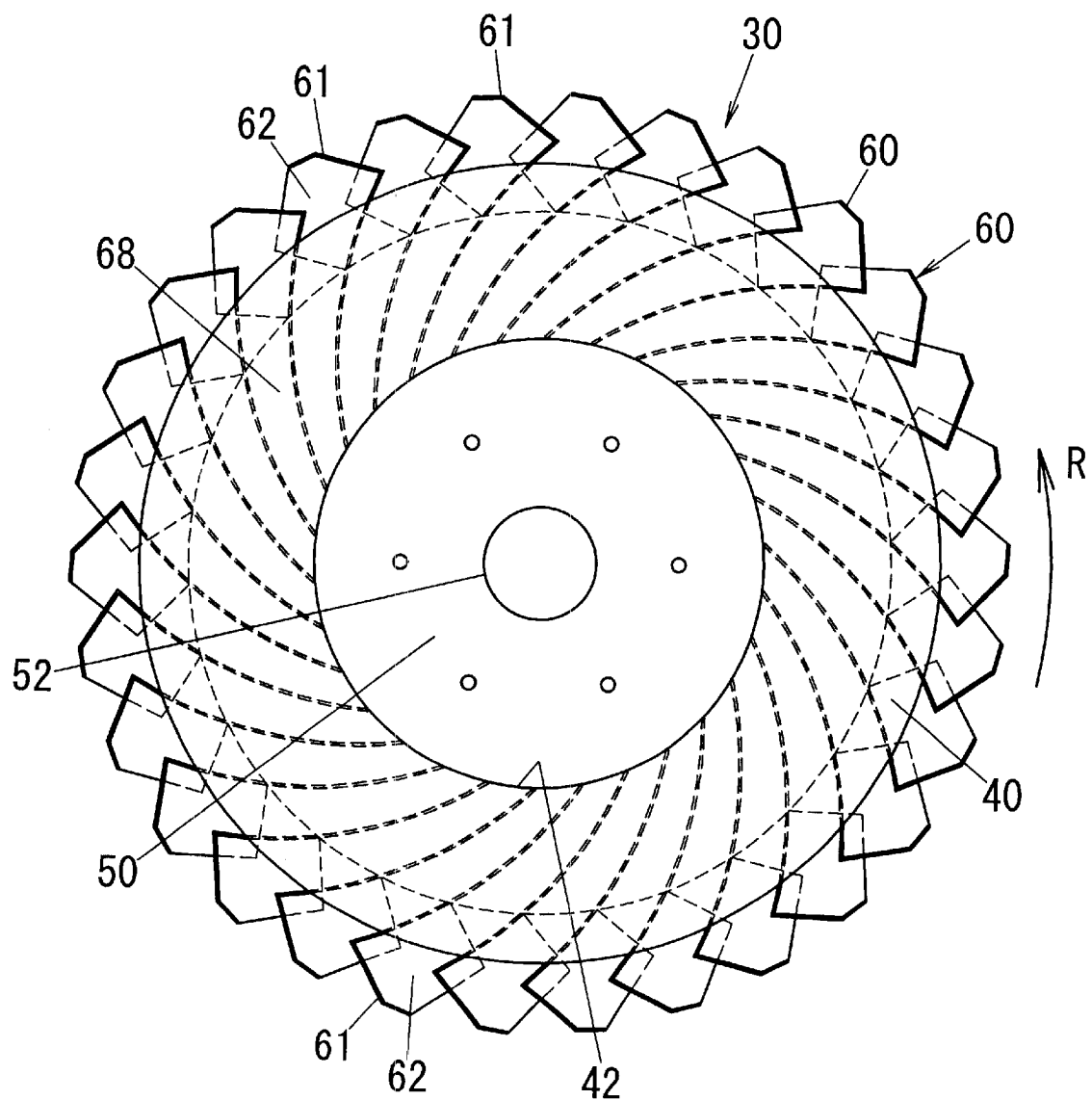
FIG. 4 is a front view of the impeller.
Figure 5:
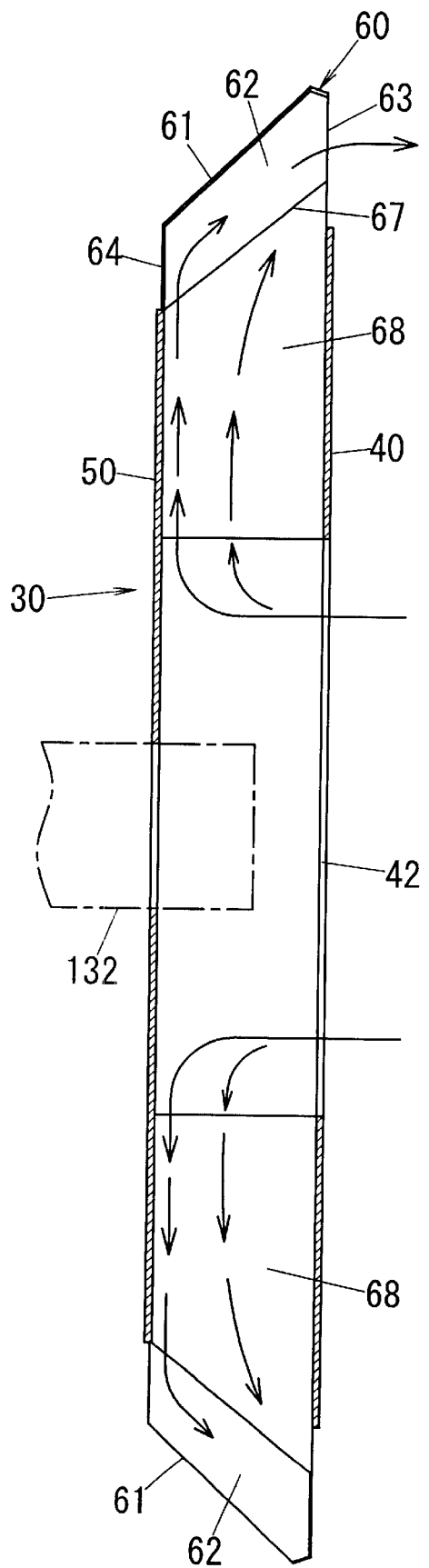
FIG. 5 is a vertical section of the impeller.

As best shown in FIGS. 3 to 5, the impeller 30 includes a front disc 40 with a center opening which defines the inlet 42 of the impeller, a rear disc 50 with a hub 52 receiving an rotating shaft 132 of the motor 130, a plurality of generally L-shaped blades 60 spaced circumferentially around the discs. The blades 60 are secured between the circumferences of the discs to assemble the impeller of a unitary structure in which the front and rear discs are held parallel and coaxially arranged about a rotating axis corresponding to an axis of the rotating shaft 132.

Each blade 60 is composed of an outer fin 61 bent from an inner fin 68 along a bent line 67. The inner fins 68 extend generally radially between the discs in a somewhat curved fashion to give radial flow paths between the adjacent inner fins 68. Each outer fin 61 is bent along the bent line 67 in the rotating direction (R) of the impeller, and projects outwardly from the discs, as best shown in FIG. 5. Further, the outer fin 61 is twisted relative to the inner fin 68 with respect to a tangential direction on the circumference of the impeller so that the outer fin 61 has its inside surface 62 facing forwardly in the axial direction. Thus, the outer fins 61 deflect the air proceeding through the radial flow paths toward the axially forwardly as the impeller rotates. That is, the impeller 30 is configured to be of a front-in and front-out type in which the air is drawn from the front center opening 42, then guided along the radial paths, and returned axially forwardly as being deflected by the outer fins 61 so as to be vented out through the outlet 22. The oil particles carried on the air being introduced in the impeller 30 are deposited largely on the outer fins 61 as the air flow is caused to change its flow direction at the outer fins. The oil particles thus deposited on the fins are flung outwardly by a centrifugal force acting thereon and are accumulated on the bottom of the casing 20 from which they are recovered through a drain port 26 into the oil pan 140. The clean air removed of the oil particles is forced to flow out through the outlet 22.

Since the outer fins 61 is responsible for deflecting the radial air flow axially forwardly and therefore creating a forced air flow out from the impeller in the axially forward direction, as indicated by arrows shown in FIG. 5, even the radially outward air flow proceeding immediately along the rear disc 50 is caused to merge successfully into the forced air flow directed in the axially forward direction, thereby being prevented from escaping axially rearward of the rear disc 50 without colliding against the outer fins 61. Thus, the oil particles carried on the air flow proceeding immediately along the rear disc 50 can be successfully separated by collision against the outer fins, giving improved oil separation efficiency.

As shown in FIG. 5, the bent line 67 is inclined with respect to the rotation axis of the impeller 30 such that the bent line has a radial distance from the rotation axis which is greater towards its front end 63 than at a rear end 64. With this arrangement, the upper fin 61 is given the inside surface 62 of an increased surface area within a limited axial spacing between the discs 40 and 50, improving air flow generating capacity as well as the oil separation efficiency. For the same purpose, the outer fin 61 is shaped to have a width which is greater towards the front end 63 than at the rear end 64. The width is defined between the bent line 67 and an outer circumferential edge of the outer fin 61. It is noted in this connection that the bent line 67 is coincidence with the outer edge of the rear disc 50 at the rear end 64 of the fin 61 and is spaced radially outwardly at the front end 63 of the fin from the outer edge of the front disc 40 which has a larger diameter than the rear disc 50.

Figure 6:
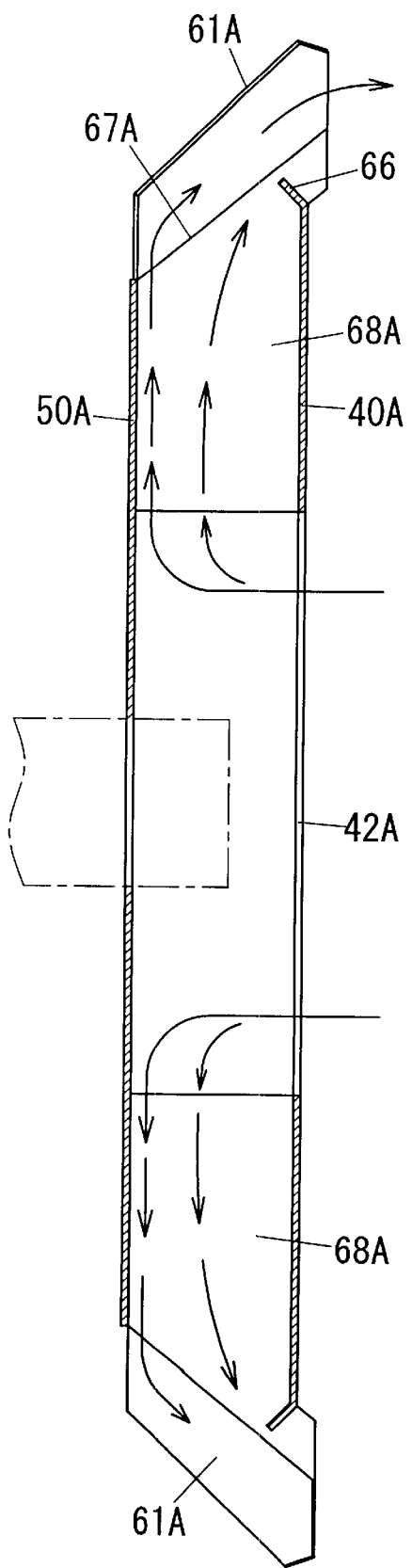
FIG. 6 is a vertical section of a modified impeller.
Figure 7:
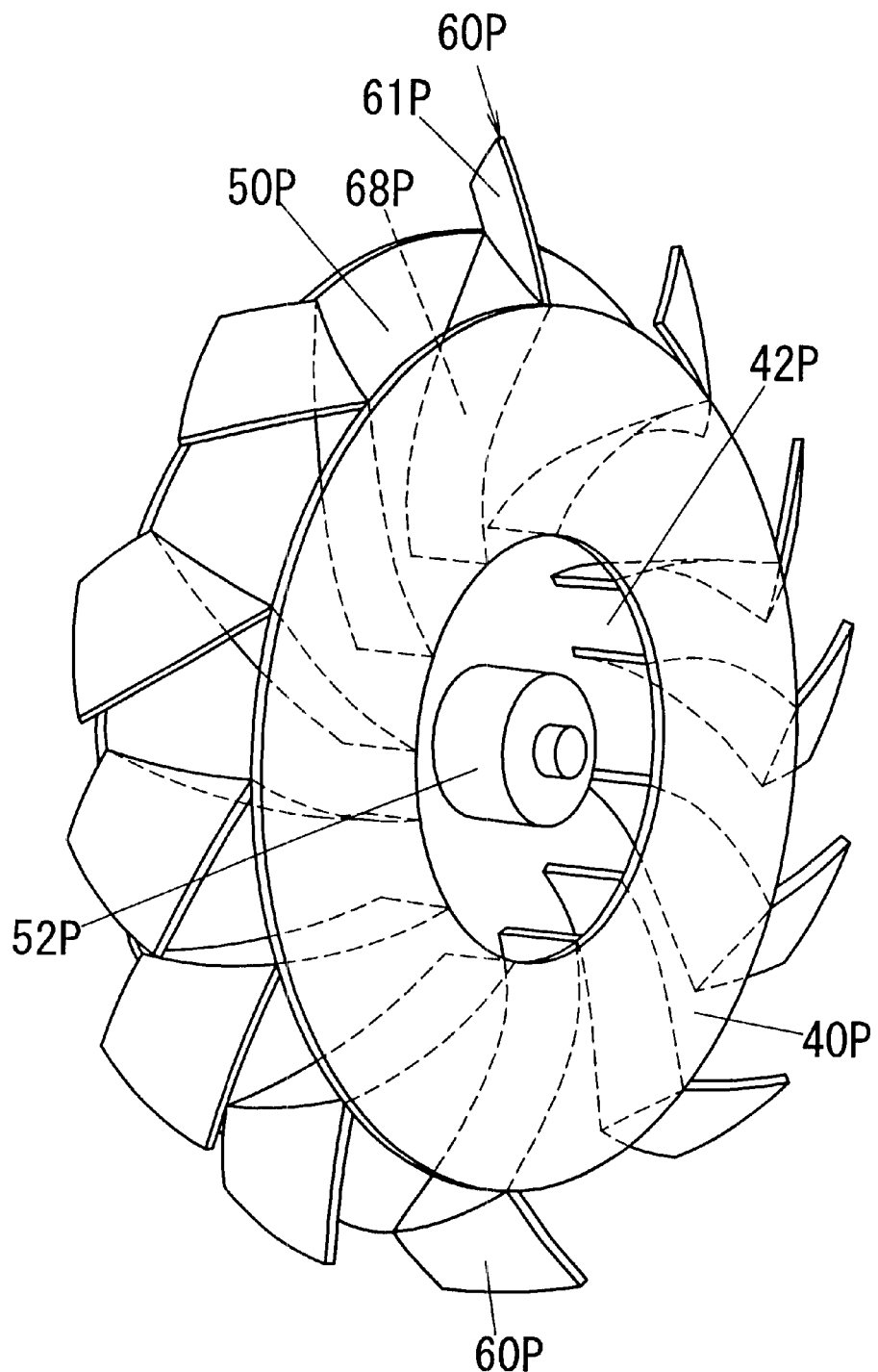
FIG. 7 is a perspective view of an impeller utilized in a prior oil mist eliminator.
Figure 8:
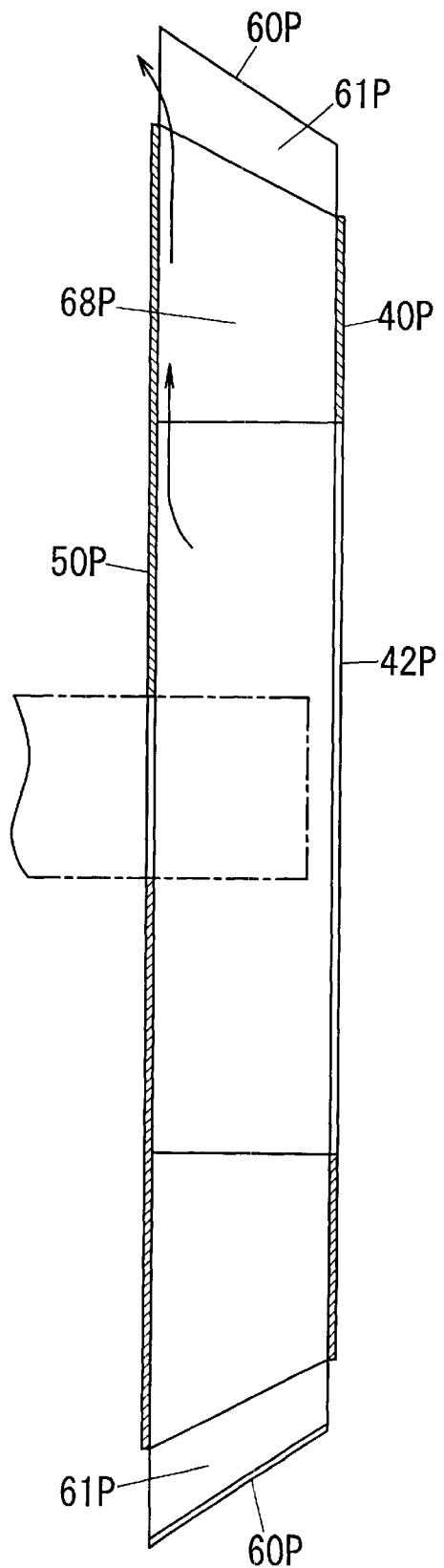
FIG. 8 is a vertical section of the impeller of the prior oil mist eliminator.

In order to further enhance the air flow generating capacity as well as the oil separation efficiency, the impeller may be modified, as shown in FIG. 6, to give an increased surface area to the outer fin 61A by projecting the front end 63A of the outer fin 61A together with an adjacent portion of the inner fin 68A. In addition, the front disc may have its outer periphery bent rearward to form thereat a baffer rim 66 which is inclined with respect to the front disc 40A in order to impede the air flow, especially proceeding along the front disc, from escaping out through the impeller without colliding against the outer fin 61A. Like parts are designated by like reference numerals with a suffix letter of "A" for an easy reference purpose.

What is claimed is:

1. An oil mist eliminator for removing oil mist form a contaminated air and discharge a clean air, said eliminator comprising:

a casing having an inlet for drawing the contaminated air and an outlet for discharging the clean air, an impeller being accommodated within said casing, said impeller having a rotation axis around which it is driven to rotate to draw in the contaminated air from said inlet and venting the clean air removed of the oil mist out through said outlet;

said impeller comprising:

a rear disc provided at its center with a hub for receiving a rotating shaft in registration with said rotation axis, a front disc spaced forwardly of said rear disc in a coaxial relation thereto, said front disc having a center front opening in registration with said inlet, a plurality of blades spaced circumferentially around said impeller and being secured between said rear disc and said front disc, each of said blades being of a generally L-shaped configuration having an inner fin extending generally in a radial direction of said impeller and an outer fin which is bent from said inner fin in a rotating direction of said impeller, said outer fin projecting radially outwardly of said rear and front discs to deflect an radial air flow proceeding between the adjacent inner fins so as to deposit the oil mist carried on the contaminated air on said outer fin by collision with the outer fin, while permitting the clean air removed of the oil mist to flow in a deflected direction, said outer fin being twisted with respect to a tangential direction on the circumference of said impeller forwardly of said rotation axis so that the outer fin has its inside surface facing forwardly of said rotation axis, thereby directing said clean air axially forwardly to discharge the same out through said outlet.

2. The oil mist eliminator as set forth in claim 1, wherein said outer fin is bent from said inner fin along a bent line which is inclined with respect to the rotation axis such that the bent line has a radial distance from said rotation axis which is greater towards its front end than at its rear end.

3. The oil mist eliminator as set forth in claim 2, wherein said outer fin has a width which is defined between said bent line and an outer circumferential edge of said outer fin, said width being greater towards the front end of the outer fin than at the rear end.

4. The oil mist eliminator as set forth in claim 2, wherein said front disc has its outer periphery bent rearwards to form thereat a baffler rim which is inclined with respect to said front disc in order to impede the air flow from escaping out through the impeller without colliding against the outer fin.

5. The oil mist eliminator as set forth in claim 2, wherein said outer fin has its front end projecting forwardly beyond a plane of said front disc.

* * * * *